United States Patent
Whittle et al.

(10) Patent No.: US 10,808,553 B2
(45) Date of Patent: Oct. 20, 2020

(54) INTER-COMPONENT SEALS FOR CERAMIC MATRIX COMPOSITE TURBINE VANE ASSEMBLIES

(71) Applicant: Rolls-Royce plc, London (GB)

(72) Inventors: Michael J. Whittle, Derby (GB); Anthony Razzell, Derbyshire (GB)

(73) Assignee: Rolls-Royce plc, London ( * ) Notice: Subject to any disclaimer, the term of this patent is extended or adjusted under 35 U.S.C. 154(b) by 0 days.

(21) Appl. No.: 16/189,690

(22) Filed: Nov. 13, 2018

(65) Prior Publication Data
US 2020/0149418 A1 May 14, 2020

(51) Int. Cl.
| F01D 9/04  | (2006.01) |
| F01D 17/16 | (2006.01) |
| F01D 25/24 | (2006.01) |
| F01D 5/22  | (2006.01) |
| F01D 5/28  | (2006.01) |
| F01D 11/00 | (2006.01) |

(52) U.S. Cl.
CPC .......... *F01D 5/225* (2013.01); *F01D 5/284* (2013.01); *F01D 9/041* (2013.01); *F01D 11/003* (2013.01); *F01D 25/24* (2013.01); *F05D 2240/11* (2013.01); *F05D 2240/125* (2013.01); *F05D 2240/14* (2013.01); *F05D 2260/941* (2013.01); *F05D 2300/6033* (2013.01)

(58) Field of Classification Search
CPC . F01D 5/225; F01D 5/284; F01D 9/02; F01D 9/04; F01D 9/041; F01D 9/047; F01D 11/003; F01D 11/005; F01D 11/02; F01D 11/025; F01D 25/24; F05D 2240/11; F05D 2240/125; F05D 2240/14; F05D 2260/941; F05D 2300/6033
See application file for complete search history.

(56) References Cited

U.S. PATENT DOCUMENTS

| 6,164,903 A *   | 12/2000 | Kouris ............. F01D 9/04 415/135    |
| 6,270,311 B1    | 8/2001  | Kuwabara et al.                          |
| 7,600,967 B2    | 10/2009 | Pezzetti, Jr. et al.                     |
| 7,824,152 B2 *  | 11/2010 | Morrison ............ F01D 9/042 415/135  |
| 8,905,711 B2 *  | 12/2014 | Suciu ............... F01D 25/246 415/193 |
| 9,850,775 B2    | 12/2017 | Pietrobon et al.                         |
| 9,945,256 B2    | 4/2018  | Freeman et al.                           |
| 2004/0047725 A1 | 3/2004  | Tomita et al.                            |
| 2007/0122266 A1*| 5/2007  | Cairo ............... F01D 25/12 415/134  |
| 2007/0297900 A1*| 12/2007 | Abgrall ............. F01D 5/225 415/209.3|
| 2009/0003993 A1*| 1/2009  | Prill ............... F01D 5/284 415/134  |
| 2011/0008156 A1*| 1/2011  | Prentice ........... F01D 5/282 415/200   |

(Continued)

*Primary Examiner* — Igor Kershteyn
(74) *Attorney, Agent, or Firm* — Barnes & Thornburg LLP (57) ABSTRACT

Turbine vane assemblies incorporating both metallic and ceramic matrix composite materials are provided in the present disclosure. The turbine vane assemblies further include interface components that allow for differing rates of thermal expansion in the ceramic matrix composite components and the metallic components.

20 Claims, 8 Drawing Sheets

(56) References Cited

U.S. PATENT DOCUMENTS

| | | | |
|---|---|---|---|
| 2014/0001285 A1* | 1/2014 | Grooms, III | F01D 25/00 |
| | | | 239/265.11 |
| 2016/0169033 A1* | 6/2016 | Weaver | F01D 25/005 |
| | | | 415/200 |
| 2016/0245108 A1 | 8/2016 | Sippel et al. | |
| 2017/0022833 A1* | 1/2017 | Heitman | F01D 25/243 |
| 2017/0254271 A1 | 9/2017 | Hillier | |
| 2018/0195401 A1 | 7/2018 | Sippel et al. | |
| 2018/0340431 A1* | 11/2018 | Kerns | F01D 9/042 |
| 2019/0390558 A1* | 12/2019 | Sippel | F01D 25/24 |

* cited by examiner

FIG. 17

INTER-COMPONENT SEALS FOR CERAMIC MATRIX COMPOSITE TURBINE VANE ASSEMBLIES

FIELD OF THE DISCLOSURE

The present disclosure relates generally to hot section components for gas turbine engines. More specifically, the present disclosure relates to vane assemblies made from ceramic-containing and metallic components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils of the vanes/blades heats the airfoils to temperatures that require the airfoils to be made from high temperature materials and/or to be actively cooled by supplying relatively cool air to the vanes and blades. To this end, some airfoils for vanes and blades are being made from ceramic-containing composite materials adapted to withstand very high temperatures. Design and manufacture of vanes and blades from ceramic containing composite materials presents challenges because of the complex geometry and strength required for the parts.

SUMMARY

The present disclosure may comprise one or more of the following features and combinations thereof.

In accordance with the present disclosure, a turbine vane assembly adapted for use in a gas turbine engine includes a metallic turbine case and a plurality of ceramic matrix composite turbine vanes. The metallic turbine case is arranged circumferentially around the central axis. The ceramic matrix composite turbine vanes are made from ceramic-containing materials suitable for direct interaction with temperatures driven by hot, high-pressure products discharged from the combustor through a gas path. The turbine case has a larger coefficient of thermal expansion compared to the turbine vanes which results in faster and/or greater thermal expansion. The gap between the turbine case and the turbine vane assembly is typically fed with air derived from the compressor at a higher static pressure than the hot gas path.

In illustrative embodiments, the turbine vane assembly further includes a plurality of vane interface seals that are configured to block movement of the hot gases out of gas path or movement of secondary air into the gas path during operation of the gas turbine engine. The vane interface seals allow for differing rates of thermal expansion experienced by the turbine case and the turbine vanes. In particular, the vane interface seals continue to block the hot gases or secondary air when the turbine case has a first diameter in a relatively cool state, and a second diameter in a relatively hot state, which is larger than the first diameter.

In illustrative embodiments, the vane interface seal includes a first seal extension coupled to a first turbine vane and a second seal extension coupled to a second turbine vane. The first and second seal extensions extend circumferentially away from their respective turbine vanes and are radially offset from one another. In this way, the first and second seal extensions overhang one another to establish a seal interface radially between the first seal interface and the second seal interface. As the turbine case increases in diameter, the first and second seal extensions translate relative to one another and maintain the seal interface in spite of this motion.

In illustrative embodiments, the vane seal interface may further include a biasing member positioned between the first turbine vane and the second turbine vane. The biasing member is configured to apply a circumferential force on each of the turbine vanes to increase sealing abilities of the vane interface seal.

In illustrative embodiments, the vane seal interface may further include a seal member to increase sealing abilities of the vane interface seal. In one example, the seal member is a rope or braid seal positioned circumferentially between the first turbine vane and the second turbine vane to increase sealing abilities of the vane interface seal. In another example, the seal member is a strip seal positioned radially between the first seal extension and the second seal extension.

In illustrative embodiments, the vane seal interface may further include a plate to increase sealing abilities of the vane interface seal. The plate is coupled radially above the vane interface seal and may be compliant or rigid. Additionally, the plate may be flat to provide face contact or curved to provide line contact.

These and other features of the present disclosure will become more apparent from the following description of the illustrative embodiments.

BRIEF DESCRIPTION OF THE DRAWINGS

FIGS. 2 and 3 are a series of perspective views of a portion of the turbine arranged in (1) a cold state, in which the metallic turbine case has a first diameter, as suggested in FIG. 2, and (2) a hot state, in which the metallic turbine case has a second diameter, as suggested in FIG. 3;

FIGS. 6 and 7 are a series of front elevation views of a second embodiment of a vane interface seal, in accordance with the present disclosure, showing the vane interface seal arranged in (1) the cold state, as shown in FIG. 6, and (2) the hot state, as shown in FIG. 7;

FIGS. 8 and 9 are a series of front elevation views of a third embodiment of a vane interface seal, in accordance with the present disclosure, showing the vane interface seal arranged in (1) the cold state, as shown in FIG. 8, and (2) the hot state, as shown in FIG. 9;

FIGS. 10 and 11 are a series of front elevation views of a fourth embodiment of a vane interface seal, in accordance with the present disclosure, showing the vane interface seal arranged in (1) the cold state, as shown in FIG. 10, and (2) the hot state, as shown in FIG. 11;

FIGS. 12 and 13 are a series of front elevation views of a fifth embodiment of a vane interface seal, in accordance with the present disclosure, showing the vane interface seal arranged in (1) the cold state, as shown in FIG. 12, and (2) the hot state, as shown in FIG. 13;

FIGS. 14 and 15 are a series of front elevation views of a sixth embodiment of a vane interface seal, in accordance with the present disclosure, showing the vane interface seal arranged in (1) the cold state, as shown in FIG. 14, and (2) the hot state, as shown in FIG. 15;

FIGS. 16 and 17 are a series of front elevation views of a seventh embodiment of a vane interface seal, in accordance with the present disclosure, showing the vane interface seal arranged in (1) the cold state, as shown in FIG. 16, and (2) the hot state, as shown in FIG. 17;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
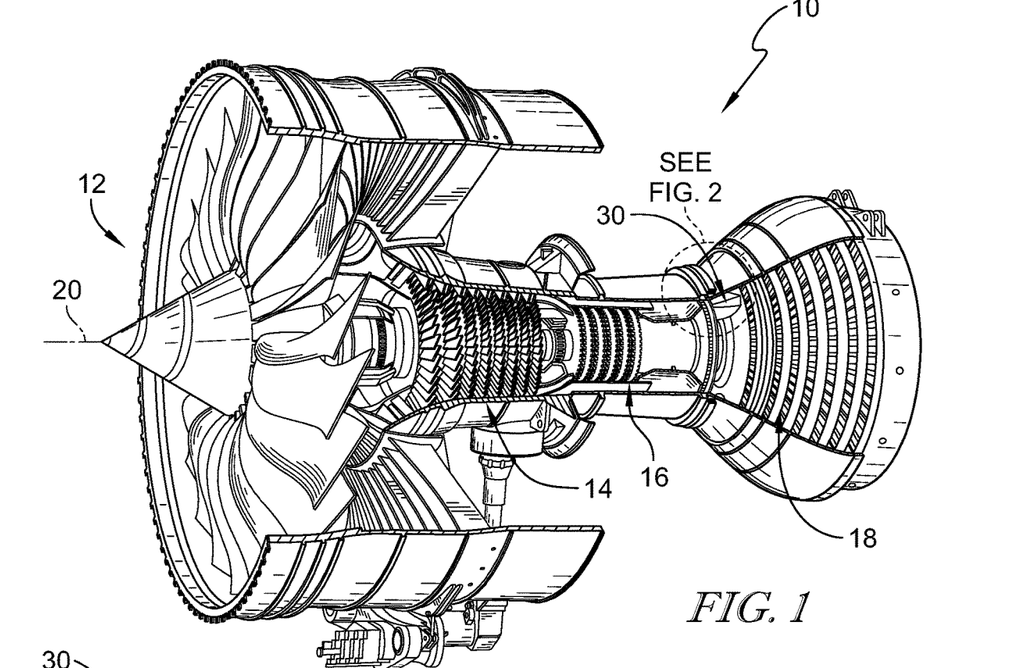
FIG. 1 is a perspective view of a gas turbine engine showing that the engine includes a fan, a compressor, a combustor and a turbine arranged to receive hot, high pressure combustion products from the combustor.

An illustrative aerospace gas turbine engine 10 is cutaway in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into a gas path of the turbine 18 to cause the turbine 18 to rotate about a central axis 20 and drive the compressor 14 and the fan 12.

Figures 2, 3:
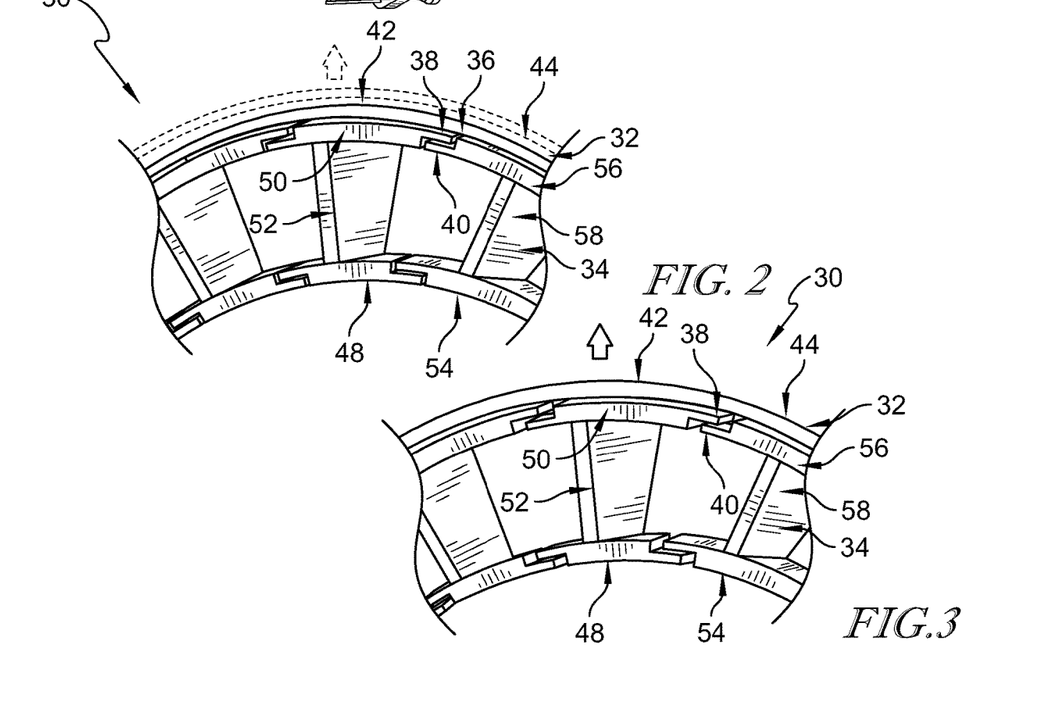
FIG. 2 is a perspective view of a section of the turbine of FIG. 1 showing that the turbine includes a nozzle-guide vane assembly having a turbine case and a plurality of ceramic-matrix composite turbine vanes coupled to the turbine case, showing that each vane includes an airfoil and an end wall coupled to a radial end of the airfoil, and further showing that each end wall includes a primary panel and a seal extension that extends circumferentially away from the primary panel and toward a seal extension of an adjacent turbine vane to create a vane interface seal.
FIG. 3 is a perspective view of the nozzle-guide vane assembly of FIG. 2 arranged in the hot state and showing that the turbine vanes are configured to translate circumferentially relative to one another as the turbine case expands in diameter and further showing that in spite of this motion the vane interface seal is maintained.

Referring now to FIG. 2, a turbine vane assembly 30 adapted for use with the turbine 18 is shown. The turbine vane assembly 30 includes a metallic turbine case 32 and a plurality of ceramic matrix composite turbine vanes 34. The metallic turbine case 32 is arranged circumferentially around the central axis 20. The ceramic matrix composite turbine vanes 34 are made from ceramic-containing materials suitable for direct interaction with temperatures driven by the hot, high-pressure products discharged from the combustor 16. In the illustrative embodiment, the turbine vanes 34 are nozzle guide vanes configured to direct the hot gases from the combustor 16 to the turbine 18 of the gas turbine engine 10.

The vane assembly 30 also includes a plurality of vane interface seals 36 provided between each ceramic matrix composite turbine vane 34 as shown in FIGS. 2-5. The vane interface seals 36 cooperate with the ceramic matrix composite turbine vanes 34 to provide upper and lower boundaries for the gas path and are configured to block movement of the hot gases out of gas path and/or block movement of secondary air into gas path during operation of the gas turbine engine 10. The vane interface seals 36 allow for differing rates of thermal expansion in the metallic turbine case 32 and the ceramic matrix composite turbine vanes 34 that result in different amounts of growth when the vane assembly 30 is heated during use. In particular, ceramic matrix composite materials are understood to grow significantly less than metallic materials when exposed to heat in the gas path.

In the illustrative embodiment, the turbine case 32 has a first coefficient of thermal expansion while the ceramic matrix composite turbine vanes 34 have a second coefficient of thermal expansion. The turbine case 32 is configured to have a first case diameter, as shown in FIG. 2, at a first relatively low temperature and a second case diameter, as shown in FIG. 3, at a second relatively high temperature that is greater than the first temperature. Put differently, the turbine case 32 is arranged in a cold state when the case 32 has the first diameter, as shown in FIG. 2, and the turbine case 32 is arranged in a hot state when the case 32 has the second diameter, as shown in FIG. 3. As noted above, the ceramic matrix composite turbine vanes 34 have a second coefficient of thermal expansion, which is smaller than the first coefficient associated with the metallic turbine case 32. As such, the turbine case 32 has greater thermal-expansion than the ceramic matrix composite turbine vanes 34.

The ceramic matrix composite turbine vanes 34 are fixed to the turbine case 32 such that they move relative to one another as the turbine case 32 thermally expands from the first case diameter to the second case diameter. In particular, the turbine vanes 34 are configured to translate away from one another as the turbine vane assembly is exposed to the second relatively-high temperature during operation of the gas turbine engine 10.

The vane interface seal 36 is configured to continue resisting movement of hot gases out of the gas path or movement of secondary air into the gas path as the turbine case 32 changes from the first diameter to the second diameter as shown in FIGS. 2 and 3. In the illustrated embodiment, each vane interface seal 36 includes a first seal extension 38 and a second seal extension 40 radially offset from the first seal extension 38. The first seal extension 38 is coupled to and extends circumferentially from a first turbine vane 42. The second seal extension 40 is coupled to and extends circumferentially from a second turbine vane 44. The first and second seal extensions 38, 40 extend circumferentially toward one another and overhang one another to provide a seal interface 46 radially between the first seal extension 38 and the second seal extension 40. In some embodiments, the seal interface 46 is defined by a gap radially between the first seal extension 38 and the second seal extension 40.

Figure 4:
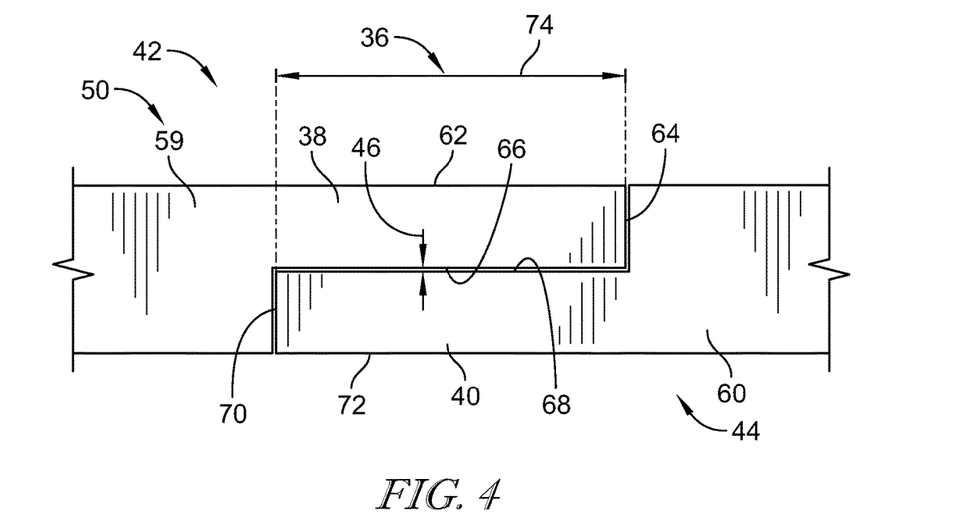
FIG. 4 is a front elevation view of the vane interface seal arranged in the cold state showing that a first seal extension is arranged radially above a second seal extension such that the first seal extension overhangs the second seal extension to establish the vane interface seal.

Conventional turbine vane assemblies may be sized and shaped to account for thermal growth of the turbine case and the turbine vanes. As such, a gap may be provided between adjacent turbine vanes when the turbine vane assembly has the first relatively-low temperature. However, in the illustrative embodiment, the first turbine vane 42 is sized and shaped to interface with the second turbine vane 44 such that space between the first and second turbine vanes 42, 44 is minimized when the turbine case has the first relatively-low temperature as shown in FIGS. 2 and 4. The seal interface 46 is maintained between the first seal extension 38 and the second seal extension 40 when the turbine case 32 has either the first case diameter in the first temperature, as suggested in FIG. 4, or the second case diameter in the second temperature, as suggested in FIG. 5.

Each ceramic matrix composite turbine vane 34 is made from ceramic matrix composite materials (such as silicon-carbide fibers in silicon-carbide matrix material) that is adapted for use at very high temperature. The first turbine vane 42 illustratively includes an inner end wall 48, an outer end wall 50, and an airfoil 52 as shown in FIGS. 2 and 3. The inner end wall 44 and the outer end wall 46 are spaced radially apart from one another and define the primary gas path therebetween. The outer end wall 50 is coupled to the turbine case 32. The airfoil 48 extends from the inner end wall 44 to the outer end wall 46 across the gas path. The airfoil 48 is shaped to interact with hot, high-pressure gasses moving through the turbine 18 to smooth out and direct flow of the gasses.

In the illustrative embodiment, the first turbine vane 42 is identical to the second turbine vane 44. As such, the second turbine vane 44 also includes an inner end wall 54, an outer end wall 56, and an airfoil 58 as shown in FIGS. 2 and 3. The end walls 54, 56 of the second turbine vane 44 cooperate with the end walls 48, 50 of the first turbine vane 42, along with end walls of the other turbine vanes 34 spaced circumferentially around the central axis 20, to provide the boundaries of the gas path.

Figure 5:
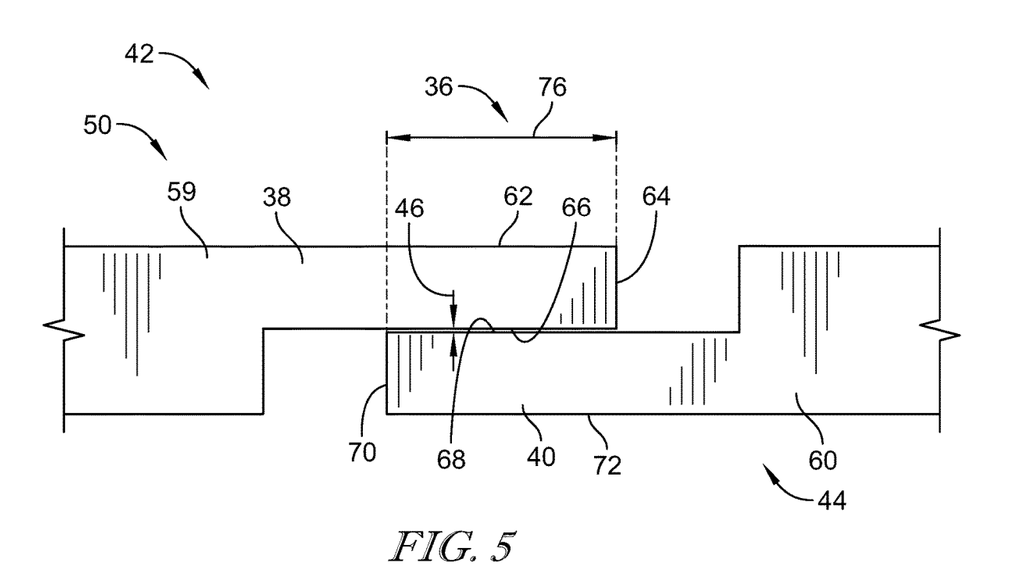
FIG. 5 is a front elevation view of the vane interface seal of FIG. 4 arranged in the hot state showing the first and second seal extensions translated relative to one another in response to the turbine case changing from the first diameter to the second diameter, and further showing that the first and second seal extensions maintain the seal interface in the hot state in spite of this motion.

The outer end wall 50 of the first turbine vane 42 includes a primary panel 59 and the first seal extension 38 as shown in FIGS. 4 and 5. The outer end wall 56 of the second turbine vane 44 includes a primary panel 60 and the second seal extension 40. Each of the primary panels 54, 60 is coupled to the respective airfoil 52, 58 and the turbine case 32. The first seal extension 38 extends circumferentially away from the primary panel 59 of the first turbine vane 42. The second seal extension 40 extends circumferentially away from the primary panel 60 of the second turbine vane 44. The first seal extension 38 is located radially above the second seal extension 40. In this way, the first seal extension 38 of the first turbine vane 42 overhangs the second seal extension 40 of the second turbine vane 44 to form the seal interface 46 therebetween.

The first seal extension 38 is defined by an upper radial surface 62, a circumferential surface 64, and a lower radial surface 66 as shown in FIGS. 4 and 5. The upper radial surface 62 faces radially outward toward the turbine case 32. The circumferential surface 64 faces circumferentially toward the primary panel 60 of the second turbine vane 44. The lower radial surface 66 engages the second seal extension 40 to provide the seal interface 46.

The second seal extension 40 is defined by an upper radial surface 68, a circumferential surface 70, and a lower radial surface 72 as shown in FIGS. 4 and 5. The upper radial surface 68 engages the first seal extension 38 to provide the seal interface 46. The circumferential surface 70 faces circumferentially toward the primary panel 59 of the first turbine vane 42. The lower radial surface 72 faces radially inward and forms a boundary of the gas path.

The turbine vane assembly 30 is shaped to minimize space between the first turbine vane 42 and the second turbine vane 44, as shown in FIG. 4, before the gas turbine engine 10 is started. The circumferential surface 64 of the first seal extension 38 interfaces the primary panel 60 of the second turbine vane 44. The circumferential surface 70 of the second seal extension 40 interfaces the primary panel 59 of the first turbine vane 42.

As the turbine case 32 changes from the first diameter at the first temperature to the second diameter at the second temperature, the first turbine vane 42 may translate relative to the second turbine vane 44 as shown in FIG. 5. In this situation, the circumferential surfaces 64, 70 of respective seal extensions 38, 40 are spaced apart from primary panels 54, 60. However, the seal extensions 38, 40 are sized to overhang one another when the turbine case 32 has the second diameter at the second temperature such that the seal interface 46 is maintained radially between the seal extensions 38, 40 at all times.

The seal interface 46 has a first circumferential distance 74 when the turbine case has the first diameter as shown in FIG. 4. The first circumferential distance generally corresponds to a circumferential length of the each seal extension 38, 40. The seal interface 46 has a second circumferential distance 76 when the turbine case 32 has the second diameter as shown in FIG. 5. The second circumferential distance 76 is smaller than the first circumferential distance 74.

In the illustrative embodiment, the primary panel 59 has a first radial thickness 56 and the seal extension 38 has a second radial thickness 58. The second radial thickness 56 is about half of the distance of the first radial thickness 58. However, in other embodiments, the radial thicknesses 56, 58 may be increased or decreased relative to one another.

Figure 6:
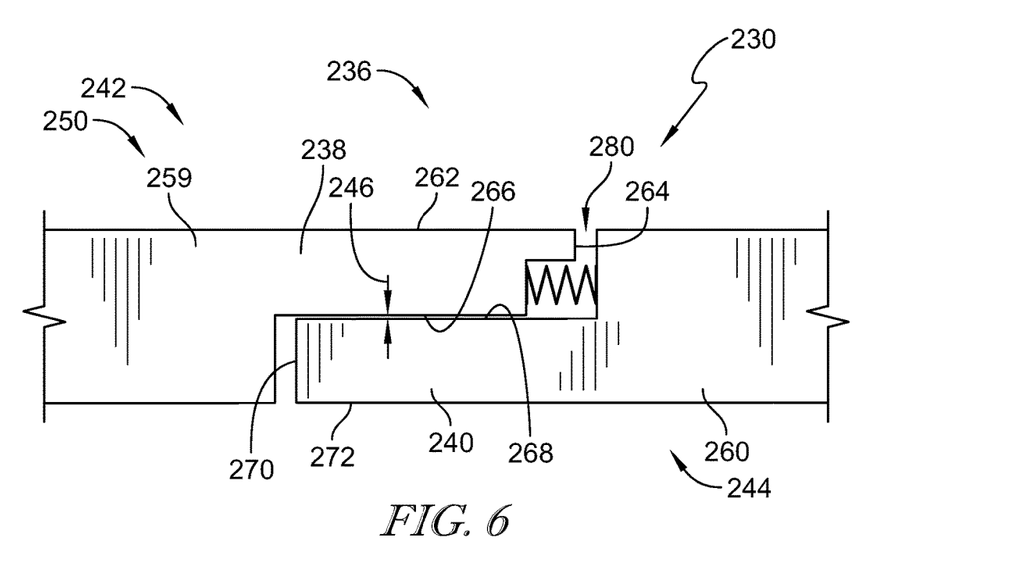
FIG. 6 is a front elevation view of the vane interface seal further including a biasing member coupled between the first seal extension and the second turbine vane.
Figure 7:
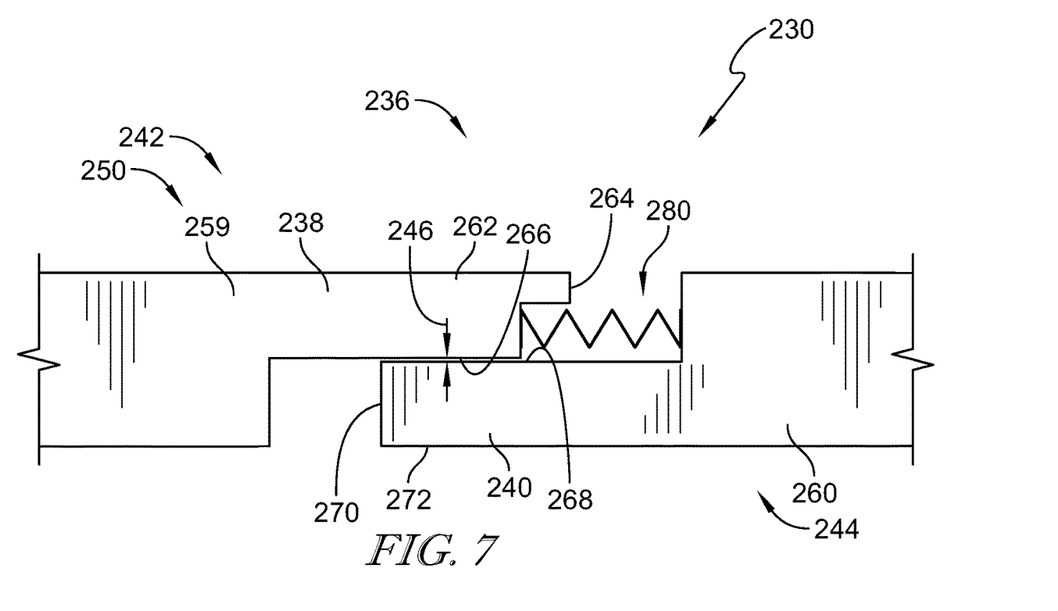
FIG. 7 is a front elevation view of the vane interface seal of FIG. 6 arranged in the hot state showing that the biasing member applies an circumferential force on the first and second turbine vanes to increase sealing abilities of the vane interface seal.

Another embodiment of a turbine vane assembly 230 in accordance with the present disclosure is shown in FIGS. 6 and 7. The turbine vane assembly 230 is substantially similar to the turbine vane assembly 30 shown in FIGS. 1-5 and described herein. Accordingly, similar reference numbers in the 200 series indicate features that are common between the turbine vane assembly 30 and the turbine vane assembly 230. The description of the turbine vane assembly 30 is incorporated by reference to apply to the turbine vane assembly 230, except in instances when it conflicts with the specific description and the drawings of the turbine vane assembly 230.

The turbine vane assembly 230 includes a metallic turbine case and a plurality of ceramic matrix composite turbine vanes. A first turbine vane 242 cooperates with a second turbine vane 244 to provide a vane interface seal 236 between the first and second turbine vanes 242, 244 as shown in FIG. 6 and 7. In the illustrative embodiment, the vane interface seal 236 includes a first seal extension 238 and a second seal extension 240.

An outer end wall 250 of the first turbine vane 242 includes a primary panel 259 and a first seal extension 238 as shown in FIGS. 6 and 7. An outer end wall 256 of the second turbine vane 244 includes a primary panel 260 and a second seal extension 240. The first seal extension 238 extends circumferentially away from the primary panel 259 of the first turbine vane 242. The second seal extension 240 extends circumferentially away from the primary panel 260 of the second turbine vane 244. The first seal extension 238 is located radially above the second seal extension 240. In this way, the first seal extension 238 of the first turbine vane 242 overhangs the second seal extension 240 of the second turbine vane 244 to form a seal interface 246 therebetween.

The first seal extension 238 is defined by an upper radial surface 262, a circumferential surface 264, and a lower radial surface 266 as shown in FIGS. 6 and 7. The upper radial surface 262 faces radially outward toward the turbine case. The circumferential surface 264 faces circumferentially toward the primary panel 260 of the second turbine vane 244. The lower radial surface 266 engages the second seal extension 240 to provide the seal interface 246.

The second seal extension 240 is defined by an upper radial surface 268, a circumferential surface 270, and a lower radial surface 272 as shown in FIGS. 6 and 7. The upper radial surface 268 engages the first seal extension 238 to provide the seal interface 246. The circumferential surface 270 faces circumferentially toward the primary panel 259 of the first turbine vane 242. The lower radial surface 272 faces radially inward and forms a boundary of the gas path.

The vane interface seal 236 further includes a biasing member 280 as shown in FIGS. 6 and 7. The biasing member 280 is arranged to lie between the first turbine vane 242 and the second turbine vane 244. In the illustrative embodiment, the biasing member 280 is positioned in a cavity between the first seal extension 238 and the primary panel 260 of the second turbine vane 244. However, in other embodiments, the biasing member 280 may be positioned between other areas of the turbine vanes 242, 244. The biasing member may be made from a high temperature capable metal, optionally TBC coated (e.g. X750, Nimonic or Haynes series), or a high temperature capable material (e.g. $Si_3N_4$, Alumina).

The biasing member 280 is configured to apply a circumferential force on the first and second turbine vanes 242, 244 as suggested in FIGS. 6 and 7. The circumferential force helps increase sealing abilities of the vane interface seal 236 as the turbine case changes from the first case diameter in the first temperature to the second case diameter in the second temperature.

Figure 8:
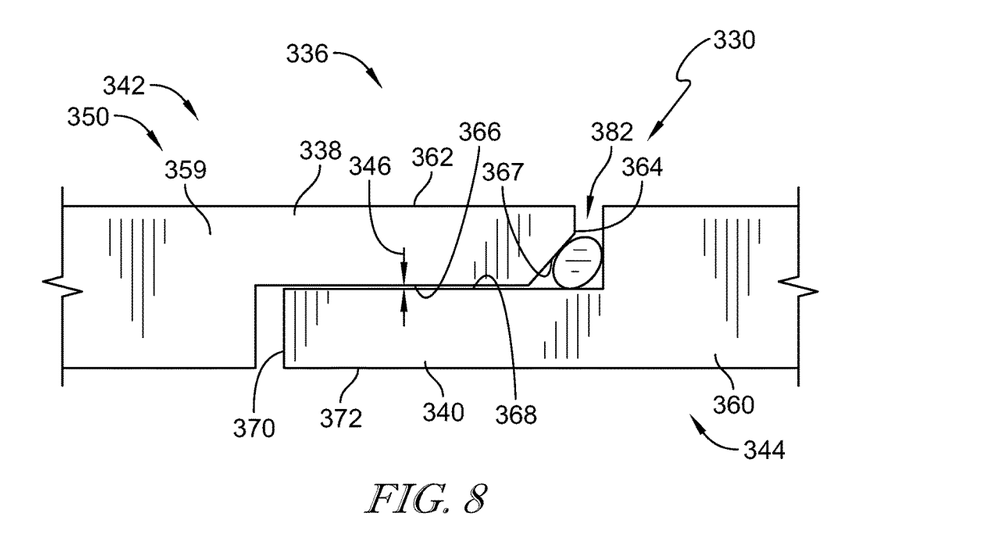
FIG. 8 is a front elevation view of the vane interface seal further including a braid or rope seal arranged between the primary panel of the second turbine vane and the seal extension of the first turbine vane.
Figure 9:
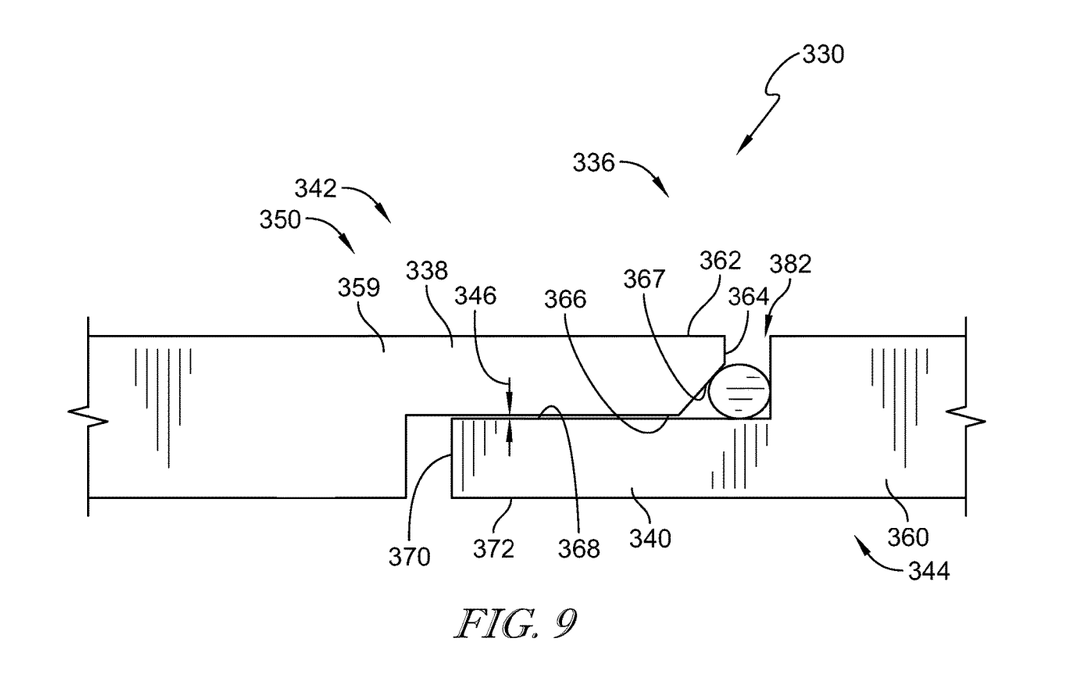
FIG. 9 is a front elevation view of the vane interface seal of FIG. 8 arranged in the hot state showing that the first and second seal extensions are configured to translate relative to one another in response to the turbine case changing from the first diameter to the second diameter and showing that the first and second seal extensions maintain the seal interface in the hot state.

Another embodiment of a turbine vane assembly 330 in accordance with the present disclosure is shown in FIGS. 8 and 9. The turbine vane assembly 330 is substantially similar to the turbine vane assembly 30 shown in FIGS. 1-5 and described herein. Accordingly, similar reference numbers in the 300 series indicate features that are common between the turbine vane assembly 30 and the turbine vane assembly 330. The description of the turbine vane assembly 30 is incorporated by reference to apply to the turbine vane assembly 330, except in instances when it conflicts with the specific description and the drawings of the turbine vane assembly 330.

The turbine vane assembly 330 includes a metallic turbine case and a plurality of ceramic matrix composite turbine vanes. A first turbine vane 342 cooperates with a second turbine vane 344 to provide a vane interface seal 336 between the first and second turbine vanes 342, 344 as shown in FIGS. 8 and 9. In the illustrative embodiment, the vane interface seal 336 includes a first seal extension 338 and a second seal extension 340.

An outer end wall 350 of the first turbine vane 342 includes a primary panel 359 and the first seal extension 338 as shown in FIGS. 8 and 9. An outer end wall 356 of the second turbine vane 344 includes a primary panel 360 and the second seal extension 340. The first seal extension 338 extends circumferentially away from the primary panel 359 of the first turbine vane 342. The second seal extension 340 extends circumferentially away from the primary panel 360 of the second turbine vane 344. The first seal extension 338 is located radially above the second seal extension 340. In this way, the first seal extension 338 of the first turbine vane 342 overhangs the second seal extension 340 of the second turbine vane 344 to form a seal interface 346 therebetween.

The first seal extension 338 is defined by an upper radial surface 362, a circumferential surface 364, a lower radial surface 366 and a chamfered surface 367 as shown in FIGS. 8 and 9. The upper radial surface 362 faces radially outward toward the turbine case. The circumferential surface 364 faces circumferentially toward the primary panel 360 of the second turbine vane 344. The lower radial surface 366 engages the second seal extension 340 to provide the seal interface 346. The chamfered surface 367 extends at an angle between the circumferential surface 364 and the lower radial surface 366.

The second seal extension 340 is defined by an upper radial surface 368, a circumferential surface 370, and a lower radial surface 372 as shown in FIGS. 8 and 9. The upper radial surface 368 engages the first seal extension 338 to provide the seal interface 346. The circumferential surface 370 faces circumferentially toward the primary panel 359 of the first turbine vane 342. The lower radial surface 372 faces radially inward and forms a boundary of the gas path.

The vane interface seal 336 further includes a seal member 382 as shown in FIGS. 8 and 9. The seal member 382 is arranged to lie between the first turbine vane 342 and the second turbine vane 344. In the illustrative embodiment, the seal member 382 is positioned between the chamfered surface 367 of the first seal extension 338 and the primary panel 360 of the second turbine vane 344. However, in other embodiments, the seal member 380 may be positioned between other areas of the turbine vanes 342, 344, such as between primary panel 359 and seal extension 340.

The seal member 382 is configured to increase sealing abilities of the vane interface seal 336 when the turbine case 332 has the first case diameter in the first temperature as suggested in FIG. 8. In the illustrative embodiment, the seal member is a rope or braid seal, however, in other embodiments, the seal member may include any suitable seal component.

Figure 10:
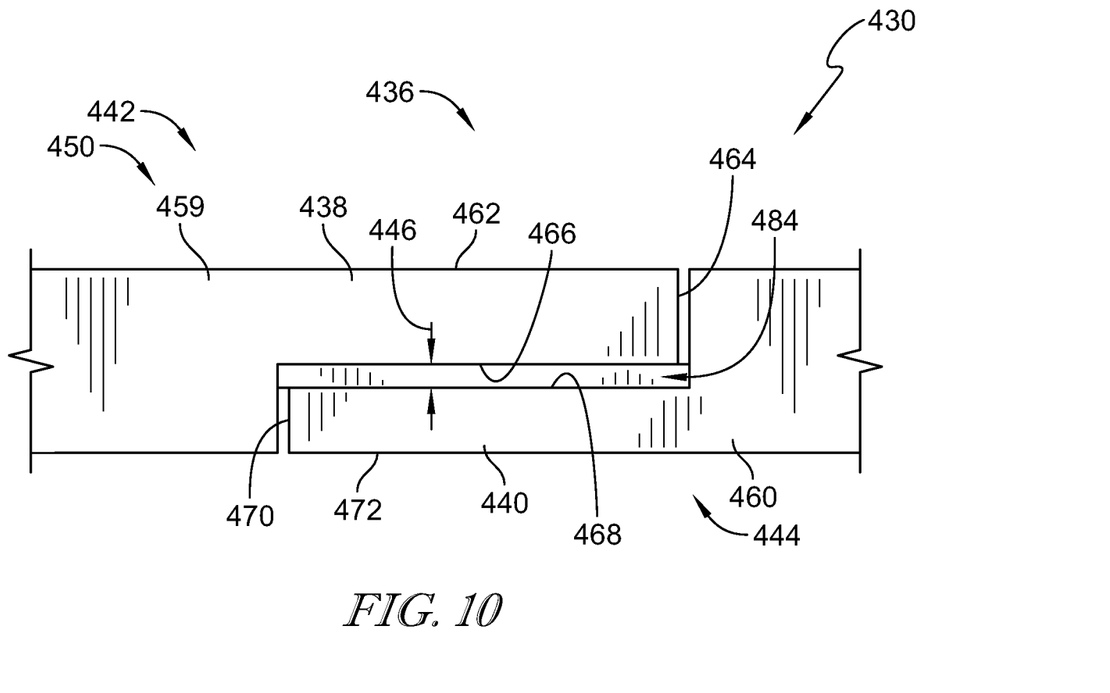
FIG. 10 is a front elevation view of the vane interface seal further including a strip seal and/or compliant strip arranged radially between the seal extension of the first turbine vane and the seal extension of the second turbine vane.
Figure 11:
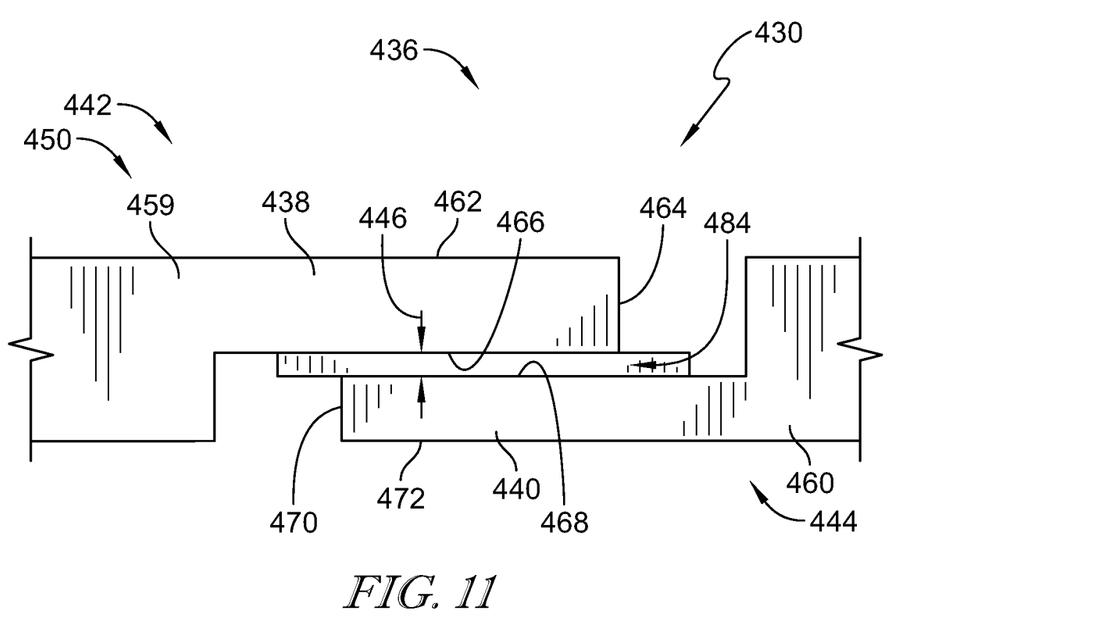
FIG. 11 is a front elevation view of the vane interface seal of FIG. 10 arranged in the hot state showing that the first and second seal extensions are configured to translate relative to one another in response to the turbine case changing from the first diameter to the second diameter and showing that the first and second seal extensions maintain the seal interface in the hot state.

Another embodiment of a turbine vane assembly 430 in accordance with the present disclosure is shown in FIGS. 10 and 11. The turbine vane assembly 430 is substantially similar to the turbine vane assembly 30 shown in FIGS. 1-5 and described herein. Accordingly, similar reference numbers in the 400 series indicate features that are common between the turbine vane assembly 30 and the turbine vane assembly 430. The description of the turbine vane assembly 30 is incorporated by reference to apply to the turbine vane assembly 430, except in instances when it conflicts with the specific description and the drawings of the turbine vane assembly 430.

The turbine vane assembly 430 includes a metallic turbine case and a plurality of ceramic matrix composite turbine vanes. A first turbine vane 442 cooperates with a second turbine vane 444 to provide a vane interface seal 436 between the first and second turbine vanes 442, 444 as shown in FIGS. 10 and 11. In the illustrative embodiment, the vane interface seal 436 includes a first seal extension 438 and a second seal extension 440.

An outer end wall 450 of the first turbine vane 442 includes a primary panel 459 and the first seal extension 438 as shown in FIGS. 10 and 11. An outer end wall 456 of the second turbine vane 444 includes a primary panel 460 and the second seal extension 440. The first seal extension 438 extends circumferentially away from the primary panel 459 of the first turbine vane 442. The second seal extension 440 extends circumferentially away from the primary panel 460 of the second turbine vane 444. The first seal extension 438 is located radially above the second seal extension 440. In this way, the first seal extension 438 of the first turbine vane 442 overhangs the second seal extension 440 of the second turbine vane 444 to form a seal interface 446 therebetween.

The first seal extension 438 is defined by an upper radial surface 462, a circumferential surface 464, and a lower radial surface 466 as shown in FIGS. 10 and 11. The upper radial surface 462 faces radially outward toward the turbine case. The circumferential surface 464 faces circumferentially toward the primary panel 460 of the second turbine vane 444. The lower radial surface 466 engages the second seal extension 440 to provide the seal interface 446.

The second seal extension 440 is defined by an upper radial surface 468, a circumferential surface 470, and a lower radial surface 472 as shown in FIGS. 10 and 11. The upper radial surface 468 engages the first seal extension 438 to provide the seal interface 446. The circumferential surface 470 faces circumferentially toward the primary panel 459 of the first turbine vane 442. The lower radial surface 472 faces radially inward and forms a boundary of the gas path.

The vane interface seal 436 further includes a seal member 484 as shown in FIGS. 10 and 11. The seal member 484 is arranged to lie between the first turbine vane 442 and the second turbine vane 444. In the illustrative embodiment, the seal member 482 is positioned between the first seal extension 438 and the second seal extension 440. However, in other embodiments, the seal member 484 may be positioned between other areas of the turbine vanes 442, 444.

The seal member 484 is configured to increase sealing abilities of the vane interface seal 436 as suggested in FIGS. 10 and 11. In the illustrative embodiment, the seal member 484 is a strip seal, however, in other embodiments, the seal member may include any suitable seal component. The strip seal 484 may translate relative to the first and second turbine vanes 442, 444 as the vanes separate due to the turbine case changing from the first diameter to the second diameter. However, in other embodiments, the seal member 484 may be fixed to either the first turbine vane 442 or the second turbine vane 444 to move therewith. The strip seal could be made from: a high temperature metallic, optionally TBC coated, optional chemical interface coating (e.g. aluminised); a CMC, optionally EBC coated member; a high temperature capable material (e.g. $Si_3N_4$, Alumina); a compliant material (e.g. mica, thermiculite or high temperature foam); a lubricious material (e.g. PM212, Ni3Al); or materials that naturally form lubricating oxide layers such as Ni—Cu—Re or Co—Cu—Re.

Figure 12:
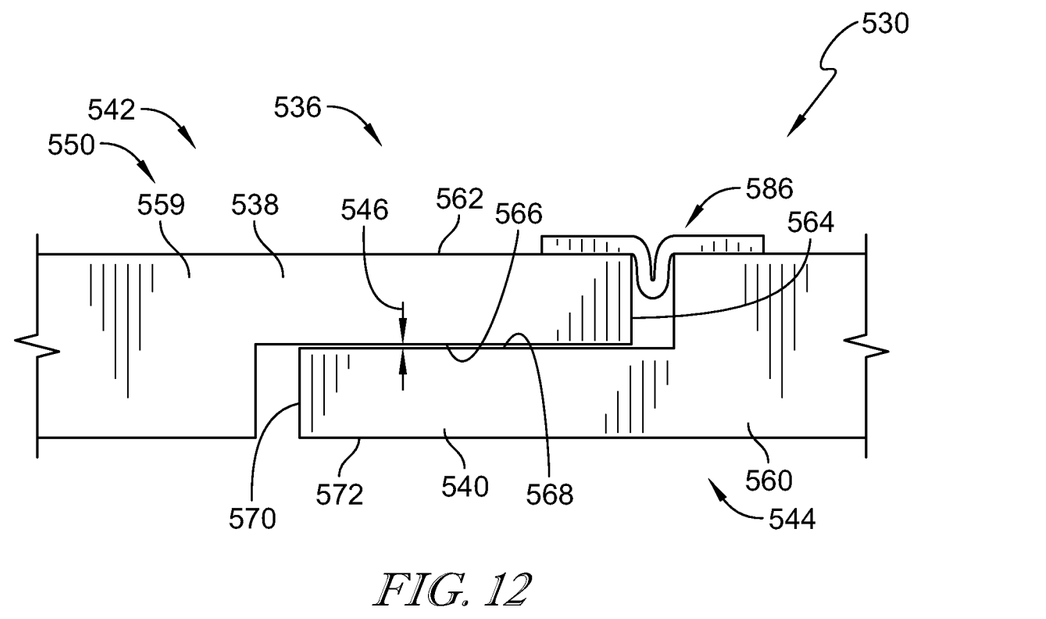
FIG. 12 is a side elevation view of the vane interface seal further including a compliant plate coupled circumferentially between the seal extension of the first turbine vane and the primary panel of the second turbine vane.
Figure 13:
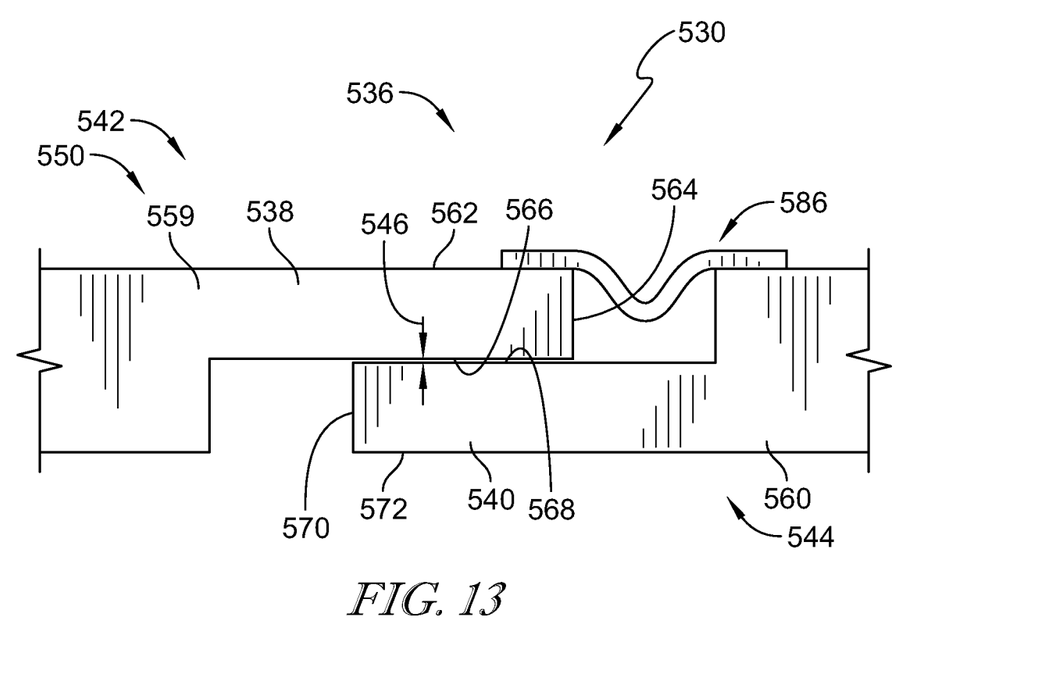
FIG. 13 is a front elevation view of the vane interface seal of FIG. 12 arranged in the hot state showing that the first and second seal extensions are configured to translate relative to one another in response to the turbine case changing from the first diameter to the second diameter and showing that the first and second seal extensions maintain the seal interface in the hot state and the compliant plate provides an additional seal interface between the first and second turbine vanes.

Another embodiment of a turbine vane assembly 530 in accordance with the present disclosure is shown in FIGS. 12 and 13. The turbine vane assembly 530 is substantially similar to the turbine vane assembly 30 shown in FIGS. 1-5 and described herein. Accordingly, similar reference numbers in the 500 series indicate features that are common between the turbine vane assembly 30 and the turbine vane assembly 530. The description of the turbine vane assembly 30 is incorporated by reference to apply to the turbine vane assembly 530, except in instances when it conflicts with the specific description and the drawings of the turbine vane assembly 530.

The turbine vane assembly 530 includes a metallic turbine case and a plurality of ceramic matrix composite turbine vanes. A first turbine vane 542 cooperates with a second turbine vane 544 to provide a vane interface seal 536 between the first and second turbine vanes 542, 544 as shown in FIGS. 12 and 13. In the illustrative embodiment, the vane interface seal 536 includes a first seal extension 538 and a second seal extension 540.

An outer end wall 550 of the first turbine vane 542 includes a primary panel 559 and the first seal extension 538 as shown in FIGS. 12 and 13. An outer end wall 556 of the second turbine vane 544 includes a primary panel 560 and the second seal extension 540. The first seal extension 538 extends circumferentially away from the primary panel 559 of the first turbine vane 542. The second seal extension 540 extends circumferentially away from the primary panel 560 of the second turbine vane 544. The first seal extension 538 is located radially above the second seal extension 540. In this way, the first seal extension 538 of the first turbine vane 542 overhangs the second seal extension 540 of the second turbine vane 544 to form a seal interface 546 therebetween.

The first seal extension 538 is defined by an upper radial surface 562, a circumferential surface 564, and a lower radial surface 566 as shown in FIGS. 12 and 13. The upper radial surface 562 faces radially outward toward the turbine case. The circumferential surface 564 faces circumferentially toward the primary panel 560 of the second turbine vane 544. The lower radial surface 566 engages the second seal extension 540 to provide the seal interface 546.

The second seal extension 540 is defined by an upper radial surface 568, a circumferential surface 570, and a lower radial surface 572 as shown in FIGS. 12 and 13. The upper radial surface 568 engages the first seal extension 538 to provide the seal interface 546. The circumferential surface 570 faces circumferentially toward the primary panel 559 of the first turbine vane 542. The lower radial surface 572 faces radially inward and forms a boundary of the gas path.

The vane interface seal 536 further includes a seal member 586 as shown in FIGS. 12 and 13. In the illustrative embodiment, the seal member 586 is positioned radially above the first turbine vane 542 and the second turbine vane 544. However, in other embodiments, the seal member 586 may be positioned between other areas of the turbine vanes 542, 544.

The seal member 586 is configured to increase sealing abilities of the vane interface seal 536 as suggested in FIGS. 12 and 13. In the illustrative embodiment, the seal member 584 is a compliant plate, however, in other embodiments, the seal member may include any suitable seal component. Circumferential ends of the seal member 586 are fixed to both the first turbine vane 542 and the second turbine vane 544, respectively. However, in other embodiments, only one end of the seal member 586 may be fixed to either the first turbine vane 542 or the second turbine vane 544. When the turbine vanes are positioned close together when the turbine case has the first case diameter, the seal member 586 may fold-up as shown in FIG. 12. As the turbine vanes spread apart during operation of the gas turbine engine, the seal member 586 may flatten as shown in FIG. 13.

Figure 14:
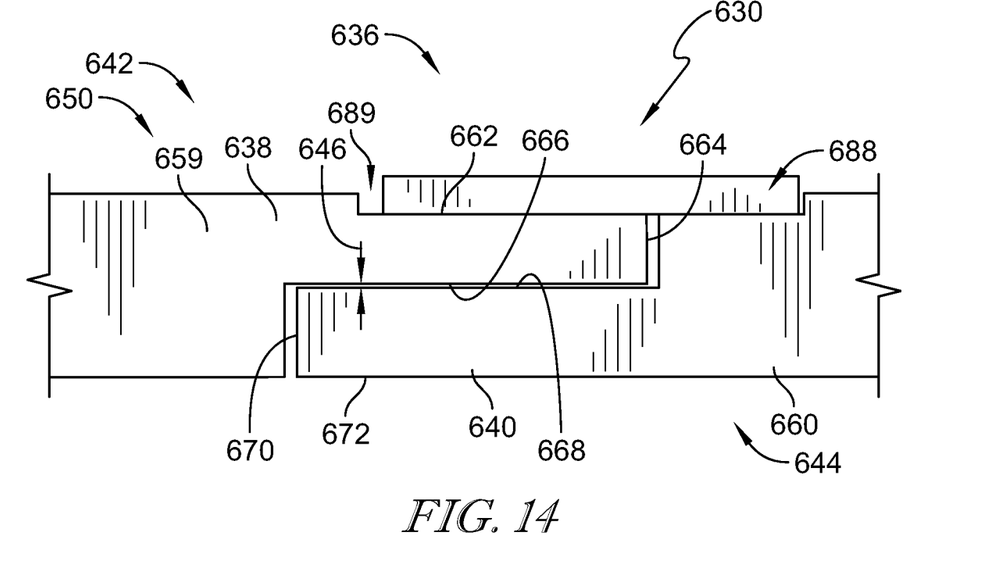
FIG. 14 is a front elevation view of the vane interface seal further including a metallic seal plate and/or ceramic matrix composite (CMC) plate coupled circumferentially between the seal extension of the first turbine vane and the primary panel of the second turbine vane.
Figure 15:
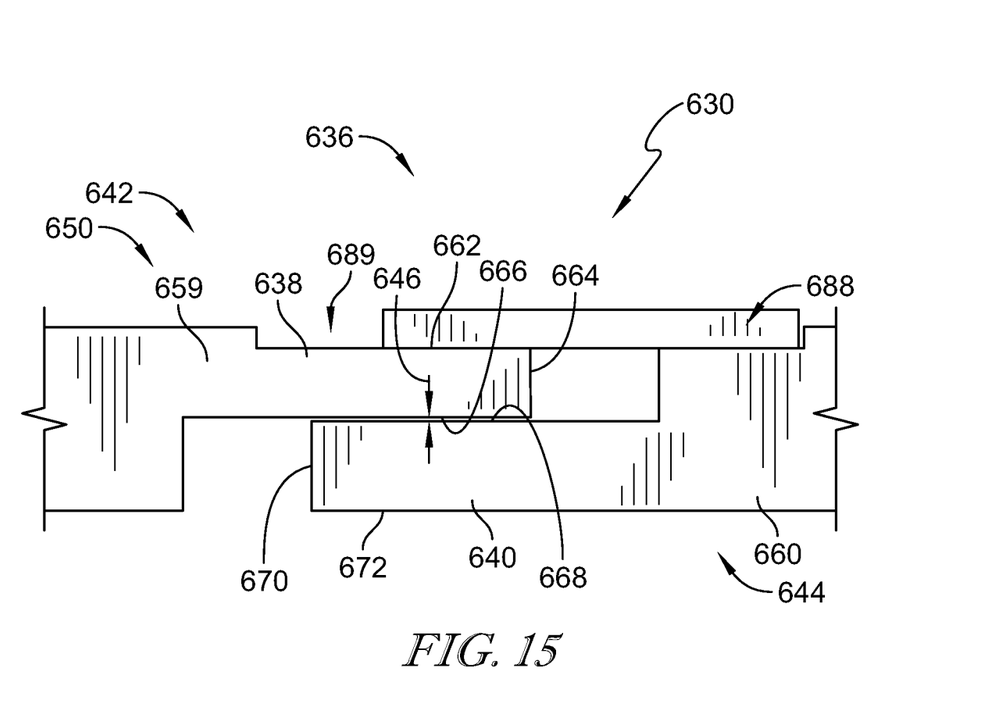
FIG. 15 is a front elevation view of the vane interface seal of FIG. 14 arranged in the hot state showing that the first and second seal extensions are configured to translate relative to one another in response to the turbine case changing from the first diameter to the second diameter and showing that the first and second seal extensions maintain the seal interface in the hot state and the metallic seal plate provides a surface seal interface between the first and second turbine vanes.

Another embodiment of a turbine vane assembly 630 in accordance with the present disclosure is shown in FIGS. 14 and 15. The turbine vane assembly 630 is substantially similar to the turbine vane assembly 30 shown in FIGS. 1-5 and described herein. Accordingly, similar reference numbers in the 600 series indicate features that are common between the turbine vane assembly 30 and the turbine vane assembly 630. The description of the turbine vane assembly 30 is incorporated by reference to apply to the turbine vane assembly 630, except in instances when it conflicts with the specific description and the drawings of the turbine vane assembly 630.

The turbine vane assembly 630 includes a metallic turbine case and a plurality of ceramic matrix composite turbine vanes. A first turbine vane 642 cooperates with a second turbine vane 644 to provide a vane interface seal 636 between the first and second turbine vanes 642, 644 as shown in FIGS. 14 and 15. In the illustrative embodiment, the vane interface seal 636 includes a first seal extension 638 and a second seal extension 640.

An outer end wall 650 of the first turbine vane 642 includes a primary panel 659 and the first seal extension 638 as shown in FIGS. 14 and 15. An outer end wall 656 of the second turbine vane 644 includes a primary panel 660 and the second seal extension 640. The first seal extension 638 extends circumferentially away from the primary panel 659 of the first turbine vane 642. The second seal extension 640 extends circumferentially away from the primary panel 660 of the second turbine vane 644. The first seal extension 638 is located radially above the second seal extension 640. In this way, the first seal extension 638 of the first turbine vane 642 overhangs the second seal extension 640 of the second turbine vane 644 to form a seal interface 646 therebetween.

The first seal extension 638 is defined by an upper radial surface 662, a circumferential surface 664, and a lower radial surface 666 as shown in FIGS. 14 and 15. The upper radial surface 662 faces radially outward toward the turbine case. The circumferential surface 664 faces circumferentially toward the primary panel 660 of the second turbine vane 644. The lower radial surface 666 engages the second seal extension 640 to provide the seal interface 646.

The second seal extension 640 is defined by an upper radial surface 668, a circumferential surface 670, and a lower radial surface 672 as shown in FIGS. 14 and 15. The upper radial surface 668 engages the first seal extension 638 to provide the seal interface 646. The circumferential surface 670 faces circumferentially toward the primary panel 659 of the first turbine vane 642. The lower radial surface 672 faces radially inward and forms a boundary of the gas path.

The vane interface seal 636 further includes a seal member 688 as shown in FIGS. 14 and 15. In the illustrative embodiment, the seal member 688 is positioned radially above the first turbine vane 642 and the second turbine vane 644. However, in other embodiments, the seal member 680 may be positioned between other areas of the turbine vanes 642, 644.

The seal member 688 is configured to form a face-contact seal interface with the first seal extension 638 to increase sealing abilities of the vane interface seal 636 as suggested in FIGS. 14 and 15. In the illustrative embodiment, the seal member 688 is a flat plate, however, in other embodiments, the seal member 688 may include any suitable seal component such as a ceramic matrix composite (CMC) plate. In yet another embodiment, the seal member 688 may be made from: a high temperature metallic, optionally TBC coated, optional chemical interface coating (e.g. aluminised); a CMC, optionally EBC coated member; a high temperature capable material (e.g. $Si_3N_4$, Alumina); a compliant material (e.g. mica, thermiculite or high temperature foam); a lubricious material (e.g. PM212, $Ni_3Al$); or materials that naturally form lubricating oxide layers such as Ni—Cu—Re or Co—Cu—Re.

Figure 16:
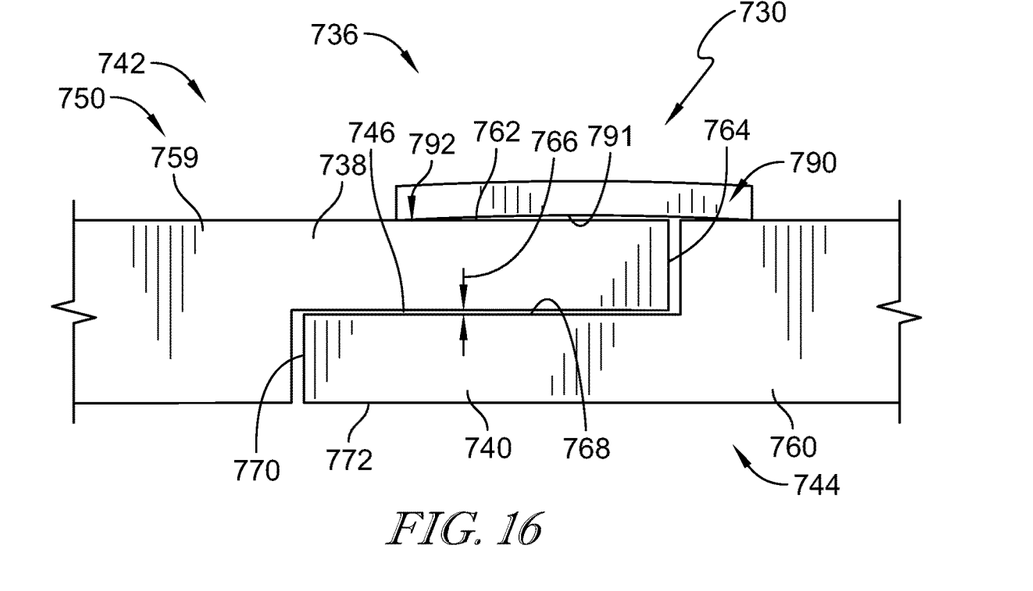
FIG. 16 is a front elevation view of the vane interface seal further including a curved seal plate coupled circumferentially between the seal extension of the first turbine vane and the primary panel of the second turbine vane.
Figure 17:
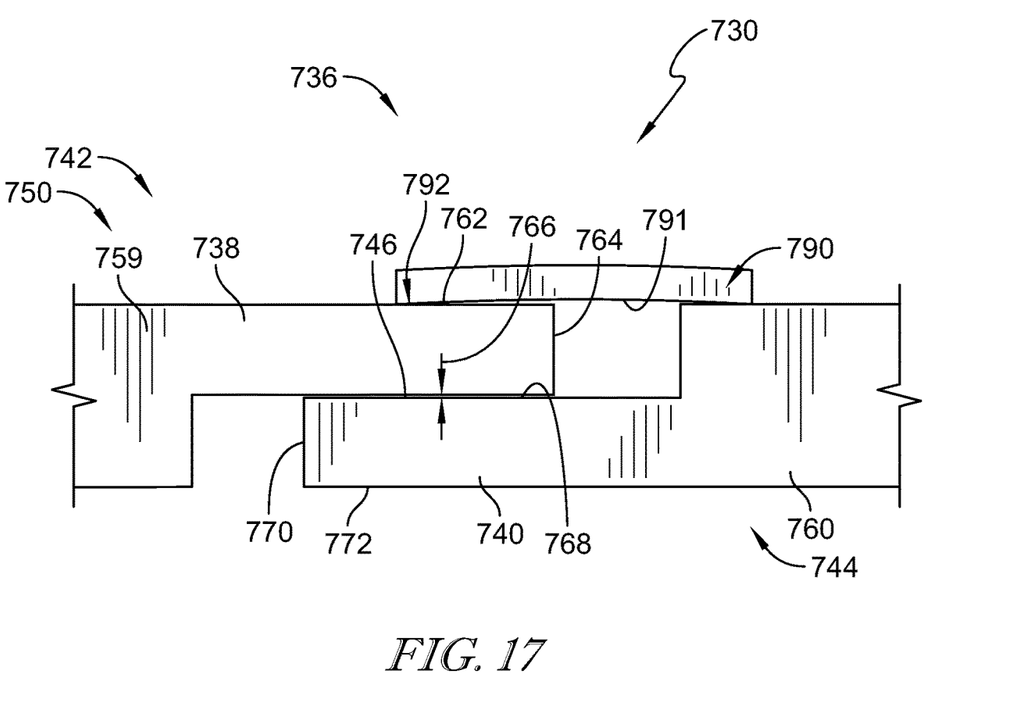
FIG. 17 is a front elevation view of the vane interface seal of FIG. 16 arranged in the hot state showing that the first and second seal extensions are configured to translate relative to one another in response to the turbine case changing from the first diameter to the second diameter and showing that the first and second seal extensions maintain the seal interface and the curved seal plate provides a line-contact seal interface between the first and second turbine vanes.

The first seal extension 638 and the primary panel 660 may be formed to include an optional recess 689. The seal member 688 may be received in the recess 689 formed in the first seal extension 638 and the primary panel 660 of the second turbine vane 644. The seal member 688 is fixed to the primary panel 660 of the second turbine vane 644 such that the seal member translates relative to the first turbine vane 642 as the turbine vanes separate as shown in FIG. 15. However, it should be noted that the seal member 688 may be fixed to the first seal extension for movement therewith in other embodiments. It should be further noted that the seal member 688 may be formed integral with one or both of the turbine vanes 642, 644. Additionally, the seal member 688 may not be fixed to either of the vanes 642, 644 and biased radially inward by a spring (not shown) acting on a structure radially above the vanes such as the turbine case. The higher static pressure of the secondary air compared with the gas path may also provide a biased force that acts to close the seal Another embodiment of a turbine vane assembly 730 in accordance with the present disclosure is shown in FIGS. 16 and 17. The turbine vane assembly 730 is substantially similar to the turbine vane assembly 30 shown in FIGS. 1-5 and described herein. Accordingly, similar reference numbers in the 600 series indicate features that are common between the turbine vane assembly 30 and the turbine vane assembly 730. The description of the turbine vane assembly 30 is incorporated by reference to apply to the turbine vane assembly 730, except in instances when it conflicts with the specific description and the drawings of the turbine vane assembly 730.

The turbine vane assembly 730 includes a metallic turbine case and a plurality of ceramic matrix composite turbine vanes. A first turbine vane 742 cooperates with a second turbine vane 744 to provide a vane interface seal 736 between the first and second turbine vanes 742, 744 as shown in FIGS. 16 and 17. In the illustrative embodiment, the vane interface seal 736 includes a first seal extension 738 and a second seal extension 740.

An outer end wall 750 of the first turbine vane 742 includes a primary panel 759 and the first seal extension 738 as shown in FIGS. 16 and 17. An outer end wall 756 of the second turbine vane 744 includes a primary panel 760 and the second seal extension 740. The first seal extension 738 extends circumferentially away from the primary panel 759 of the first turbine vane 742. The second seal extension 740 extends circumferentially away from the primary panel 760 of the second turbine vane 744. The first seal extension 738 is located radially above the second seal extension 740. In this way, the first seal extension 738 of the first turbine vane 742 overhangs the second seal extension 740 of the second turbine vane 744 to form a seal interface 746 therebetween.

The first seal extension 738 is defined by an upper radial surface 762, a circumferential surface 764, and a lower radial surface 766 as shown in FIGS. 16 and 17. The upper radial surface 762 faces radially outward toward the turbine case. The circumferential surface 764 faces circumferentially toward the primary panel 660 of the second turbine vane 744. The lower radial surface 766 engages the second seal extension 740 to provide the seal interface 746.

The second seal extension 740 is defined by an upper radial surface 768, a circumferential surface 770, and a lower radial surface 772 as shown in FIGS. 16 and 17. The upper radial surface 768 engages the first seal extension 738 to provide the seal interface 746. The circumferential surface 770 faces circumferentially toward the primary panel 759 of the first turbine vane 742. The lower radial surface 772 faces radially inward and forms a boundary of the gas path.

The vane interface seal 736 further includes a seal member 790 as shown in FIGS. 16 and 17. In the illustrative embodiment, the seal member 790 is positioned radially above the first turbine vane 742 and the second turbine vane 744. However, in other embodiments, the seal member 780 may be positioned between other areas of the turbine vanes 742, 744.

The seal member 790 is configured to form a line-contact seal interface with the first seal extension 738 to increase sealing abilities of the vane interface seal 736 as suggested in FIGS. 16 and 17. In the illustrative embodiment, the seal member 790 is a curved plate including a concave surface 791 that faces the turbine vanes, however, in other embodiments, the seal member 790 may include any suitable seal component. Due to the curved surface 791, only an end 792 of the plate engages the first seal extension 738 to provide the line-contact seal.

The seal member 790 is fixed to the primary panel 760 of the second turbine vane 744 such that the seal member 790 translates relative to the first turbine vane 742 as the turbine vanes separate as shown in FIG. 17. However, it should be noted that the seal member 790 may be fixed to the first seal extension 738 for movement therewith in other embodiments. It should be further noted that the seal member 790 may be formed integral with one or both of the turbine vanes 742, 744. Additionally, the seal member 790 may not be fixed to either of the vanes 742, 744 and biased radially inward by a spring (not shown) acting on a structure radially above the vanes such as the turbine case. It may also be biased by the secondary air being at a higher static pressure than the gas path. In some embodiments, the seal member 790 may be made from: a high temperature metallic, optionally TBC coated, optional chemical interface coating (e.g. aluminised); a CMC, optionally EBC coated member; a high temperature capable material (e.g. $Si_3N_4$, Alumina); a compliant material (e.g. mica, thermiculite or high temperature foam); a lubricious material (e.g. PM212, $Ni_3Al$); or materials that naturally form lubricating oxide layers such as Ni—Cu—Re or Co—Cu—Re.

In illustrative embodiments, ceramic-containing materials (SiC/SiC CMC) may have a coefficient of thermal expansion roughly ⅓ of nickel alloys. This means that CMC inter-platform gaps may increase with temperature rather than decrease like metallic platforms. To minimize leakage at temperature, a circumferential gap equal to about zero should be targeted at build. Conventional strip seals must include a gap to permit assembly. The present disclosure overlaps elements from each vane platform or endwall and may alleviate the sensitivity to the assembly tolerance stack.

In illustrative embodiments, conventional strip seals allow for relative thermal expansions without stressing the components, however, the design is predicated on the basis that there is significant thermal movements between components and requires a circumferential gap at build. This does not appear to be the case for CMC nozzle guide vanes (NGVs), therefore, an alternative approach may be applied to sealing inter-platform gaps.

In illustrative embodiments, the present disclosure may eliminate the need for a circumferential gap in the traditional sense and enables a reduction in leakage flows. The minimum permissible gap and overhang lengths may account for component manufacturing and assembly tolerances, in the same way the strip seal engagement and slot depth does. A radial clearance or gap may be required to assemble the NGVs without damage, however, this can be better controlled through machining and this sealing approach is based on turning the remaining gap into a tortuous path for the sealing flow and by filling the flow area to reduce leakage. The small magnitude of the relative movement lends itself to installing a compliant layer or seal member that can fully fill the flow area but there are various alternative means to minimizing the flow area. An overview is included herein but is not limited to these examples.

Furthermore, in illustrative embodiments, as electrical-discharge machining is not appropriate for SiC/SiC CMC materials, creating conventional strip seal slots is very time consuming and therefore expensive. The sealing approach described herein may lend itself to much quicker/cheaper grinding operations.

In illustrative embodiments, SiC/SiC CMC materials may be much weaker than nickel alloys. The conventional approach i.e. forcibly assembling strip seals into the NGV ring could result in (undetectable) damage to the CMC components. The present disclosure may reduce the likelihood of damage. The present disclosure is built with overlaps to create a chocked or close to chocked assembly. A close to chocked assembly at ambient temperatures may be designed to reach the point of chocking at the lowest cold soak temperature, thus avoiding damage to the CMC by compression at low temperatures. In illustrative embodiments, relatively small component to component movements enable use of alternative filler materials with potential for improved sealing effectiveness. The present disclosure could be applied to all static CMC components including IP NGVs,HP seal segments, IP seal segments and combustor components such as tiles. HP seal segments may also have to account for the turbine case cooling system. In illustrative embodiments, the present disclosure may account for the reversed thermal growths and small magnitude of the relative movement predicted.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly, the assembly comprising
a turbine case that extends at least part way around a central axis, the turbine case comprising metallic materials having a first coefficient of thermal expansion such that the turbine case is configured to have a first case diameter at a first relatively-low temperature and a second case diameter at a second relatively-high temperature that is greater than the first relatively-low temperature,
a first turbine vane coupled to the turbine case, the first turbine vane including an airfoil and an end wall arranged to define a radial boundary of a primary gas path, the first turbine vane comprising ceramic matrix composite materials having a second coefficient of thermal expansion that is less than the first coefficient of thermal expansion, wherein the end wall of the first turbine vane includes a primary panel and a seal extension that extends circumferentially from the primary panel, and
a second turbine vane coupled to the turbine case circumferentially adjacent to the first turbine vane, the second turbine vane including an airfoil and an end wall arranged to define a radial boundary of the primary gas path, the second turbine vane comprising ceramic matrix composite materials having the second coefficient of thermal expansion, wherein the end wall of the second turbine vane includes a primary panel and a seal extension that extends circumferentially from the primary panel,
wherein the seal extension of the first turbine vane is configured to radially overhang the seal extension of the second turbine vane and a circumferential vane interface seal is provided by the seal extension of the first turbine vane and the seal extension of the second turbine vane that resists the movement of hot gasses out of the primary gas path when the turbine case has either the first case diameter or the second case diameter.

2. The turbine vane assembly of claim 1, wherein the primary panel of the first vane and the primary panel of the second vane have a first thickness and the seal extension of the first vane and the seal extension of the second vane have a second thickness which is less than the first thickness.

3. The turbine vane assembly of claim 2, wherein the second thickness is about half of the first thickness.

4. The turbine vane assembly of claim 1, wherein the vane interface seal includes a biasing member located circumferentially between the seal extension of the first vane and the primary panel of the second vane.

5. The turbine vane assembly of claim 1, wherein vane interface seal includes a seal member located between the chamfered surface of the seal extension of the first vane and the primary panel of the second vane.

6. The turbine vane assembly of claim 5, wherein the seal extension of the first vane includes a chamfered surface that faces the primary panel of the second vane and the seal member is a wire seal located between the chamfered surface and second vane.

7. The turbine vane assembly of claim 5, wherein the seal member includes a strip seal located radially between the seal extension of the first vane and the seal extension of the second vane.

8. The turbine vane assembly of claim 1, wherein the vane interface seal includes a seal plate coupled to the seal extension of the first vane and the primary panel of the second vane.

9. The turbine vane assembly of claim 8, wherein the seal plate is formed from a compliant material and includes a first end fixed to the seal extension of the first vane and a second end fixed to the primary panel of the second vane.

10. The turbine vane assembly of claim 8, wherein the seal plate is formed from a rigid material and includes a first end engaged slidingly with the seal extension of the first vane and a second end fixed to the primary panel of the second vane.

11. The turbine vane assembly of claim 10, wherein the seal extension of the first vane and the primary panel of the second vane define a recess and the seal plate is located in the recess.

12. The turbine vane assembly of claim 8, wherein the seal plate is formed from a rigid material and includes a first end engaged slidingly with the seal extension of the first vane and a second end fixed to the primary panel of the second vane, and the seal plate has a concave surface relative to the seal extension of the first vane.

13. The turbine vane assembly of claim 12, wherein the first end of the seal plate engages the seal extension of the first vane and provides an axially extending line of contact between the first end of the seal plate and the seal extension of the first vane.

14. A turbine vane assembly, the assembly comprising
a metallic turbine case arranged circumferentially around a central axis,
a first turbine vane comprising ceramic matrix composite materials and including an airfoil and an end wall arranged to define a radial boundary of a primary gas path, a second turbine vane comprising ceramic matrix composite materials and arranged circumferentially adjacent to the first turbine vane, the second turbine vane including an airfoil and an end wall arranged to define a radial boundary of the primary gas path, and a vane interface seal arranged circumferentially between the first turbine vane and the second turbine vane, the vane interface seal including a first seal extension coupled to the end wall of the first turbine vane and a second seal extension coupled to the end wall of the second turbine vane, wherein the first seal extension is configured to radially overhang the second seal extension to resist the movement of hot gasses out of the primary gas path.

15. The turbine vane assembly of claim 14, wherein the primary panel of the first vane and the primary panel of the second vane have a first thickness and the seal extension of the first vane and the seal extension of the second vane have a second thickness which is less than the first thickness.

16. The turbine vane assembly of claim 15, wherein the second thickness is about half of the first thickness.

17. The turbine vane assembly of claim 14, wherein the vane interface seal includes a biasing member located circumferentially between the seal extension of the first vane and the primary panel of the second vane.

18. The turbine vane assembly of claim 14, wherein vane interface seal includes a seal member located between the chamfered surface of the seal extension of the first vane and the primary panel of the second vane.

19. A method of assembling a turbine vane assembly, the method comprising providing a turbine case that extends around a central axis, a first vane including an airfoil and an end wall arranged to define a radial boundary of a primary gas path, and a second vane including an airfoil and an end wall arranged to define a radial boundary of a primary gas path, machining a first seal extension in the end wall of the first vane, the first seal extension extending circumferentially toward the end wall of the second vane and located a first radial distance from central axis, machining a second seal extension in the end wall of the second vane, the second seal extension extending circumferentially toward the end wall of the first vane and located a second radial distance from central axis that is less than the first radial distance, minimizing a distance between the first vane and the second vane while the turbine case has a first diameter, and overhanging the first seal extension over the second seal extension to provide a vane interface seal between the first turbine vane and the second turbine vane while the turbine case has either the first diameter or a second diameter that is larger than the first diameter.

20. The method of claim 19, further comprising providing a seal member included in the vane interface seal.

* * * * *